(12) United States Patent
Zaizen et al.

(10) Patent No.: US 10,996,671 B2
(45) Date of Patent: May 4, 2021

(54) DRIVING ASSIST APPARATUS

(71) Applicant: SUBARU CORPORATION, Tokyo (JP)

(72) Inventors: Motoki Zaizen, Tokyo (JP); Hajime Oyama, Tokyo (JP); Ryosuke Namba, Tokyo (JP); Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 183 days.

(21) Appl. No.: 16/159,378

(22) Filed: Oct. 12, 2018

(65) Prior Publication Data

US 2019/0146489 A1 May 16, 2019

(30) Foreign Application Priority Data

Nov. 16, 2017 (JP) .............................. JP2017-220703

(51) Int. Cl.
    *G05D 1/00* (2006.01)
    *B60W 50/08* (2020.01)
    *B60W 40/08* (2012.01)

(52) U.S. Cl.
    CPC ........... *G05D 1/0061* (2013.01); *B60W 40/08* (2013.01); *B60W 50/08* (2013.01); *G05D 1/0088* (2013.01); *B60W 2040/0818* (2013.01)

(58) Field of Classification Search
    CPC .... G05D 1/0061; B60W 40/08; B60W 50/08; B60W 2040/0818
    (Continued)

(56) References Cited

U.S. PATENT DOCUMENTS 8,670,891 B1 3/2014 Szybalski et al.
10,067,505 B2 * 9/2018 Ichikawa .......... B60W 60/0053
(Continued)

FOREIGN PATENT DOCUMENTS

JP 2017-097519 A 6/2017
JP 2017-157067 A 9/2017
(Continued)

OTHER PUBLICATIONS

EPO English translation JP-2018203007-A (Year: 2018).*
(Continued)

*Primary Examiner* — Yazan A Soofi
(74) *Attorney, Agent, or Firm* — McDermott Will & Emery LLP

(57) ABSTRACT

A driving assist apparatus includes a driving mode setting calculator and a steering wheel holding detector. The driving mode setting calculator is configured to control a transition between driving modes including a manual driving mode, a first driving assist mode, and a second driving assist mode, in accordance with a driving condition. The steering wheel holding detector is configured to detect whether the driver holds the steering wheel or releases the steering wheel. The driving mode setting calculator causes the driving modes to make the transition from the first driving assist mode to the second driving assist mode, on a condition that the first driving assist mode is set as the driving modes and the steering wheel holding detector detects that the driver releases, from a state in which the driver holds the steering wheel, the steering wheel.

6 Claims, 7 Drawing Sheets

(58) Field of Classification Search
USPC .......................................................... 701/42
See application file for complete search history.

(56) References Cited

U.S. PATENT DOCUMENTS

| | | | |
|---|---|---|---|
| 2016/0091083 A1* | 3/2016 | Drees ...................... | B60L 15/10 |
| | | | 74/473.18 |
| 2016/0304124 A1* | 10/2016 | Fujiyoshi ............. | G05D 1/0061 |
| 2017/0327111 A1* | 11/2017 | Bonarens ............. | B60W 30/08 |
| 2017/0351256 A1* | 12/2017 | Kumakiri ............ | B60W 40/064 |
| 2018/0074497 A1* | 3/2018 | Tsuji ............... | B60W 30/18163 |
| 2018/0348758 A1* | 12/2018 | Nakamura ............ | B60W 50/00 |
| 2019/0039626 A1* | 2/2019 | Hatano .................... | B62D 6/00 |
| 2019/0077411 A1* | 3/2019 | Oishi ................ | G06K 9/00805 |
| 2019/0241198 A1* | 8/2019 | Mori ..................... | B60W 50/14 |
| 2019/0300053 A1* | 10/2019 | Mizoguchi ......... | B62D 15/0255 |
| 2020/0064839 A1* | 2/2020 | Oyama ........... | B60W 60/00182 |
| 2020/0339128 A1* | 10/2020 | Kanoh ................. | B60W 30/00 |

FOREIGN PATENT DOCUMENTS

| | | | | |
|---|---|---|---|---|
| JP | 2018203007 A | * | 12/2018 | ........... B60W 30/12 |
| WO | 2017/141396 A1 | | 8/2017 | |

OTHER PUBLICATIONS

Japanese Notice of Reasons for Refusal issued in corresponding Japanese Patent Application No. 2017-220703, dated Aug. 20, 2019, with English translation.

* cited by examiner

DRIVING ASSIST APPARATUS

CROSS-REFERENCE TO RELATED APPLICATIONS

The present application claims priority from Japanese Patent Application No. 2017-220703 filed on Nov. 16, 2017, the entire contents of which are hereby incorporated by reference.

BACKGROUND

The technology relates to a driving assist apparatus that assists driving performed by a driver of a vehicle.

Various proposals have been made on techniques related to a driving assist that reduces a burden imposed on a driver and allows for comfortable and safe driving. Some of such proposals have been already put into practical use in recent vehicles.

The driving assist includes an adaptive cruise control (ACC) and a lane keeping control. Providing the ACC and the lane keeping control makes it possible to allow a vehicle to travel automatically along a traveling lane while keeping a distance between the own vehicle and a preceding vehicle.

Such a driving assist that includes the ACC and the lane keeping control has: a driving assist mode in which a driver is required to take over a driving operation when a controller of a vehicle determines that continuation of automatic driving is difficult; and a driving assist mode in which the driver is not required to take over the driving operation even when the controller of the vehicle determines that the continuation of the automatic driving is difficult. Hereinafter, the former and the latter are respectively referred to as a "first driving assist mode" and a "second driving assist mode".

The first driving assist mode is a driver-based driving assist in which the driver is required to stand by and ready to take over the driving constantly while holding a steering wheel. The second driving assist mode is a controller-based driving assist in which, for example, the controller performs an avoidance control, such as stopping the vehicle near a side strip automatically, without requiring the driver to take over the driving operation even when the controller of the vehicle determines that the continuation of the automatic driving is difficult.

The controller also causes the driving modes to make a transition from the first driving assist mode to the second driving assist mode when the controller determines that making the transition from the first driving assist mode to the second driving assist mode is possible during execution of the first driving assist mode. In this case, the controller causes the driving modes to make the transition after notifying the driver of switching of the driving modes.

For example, Japanese Unexamined Patent Application Publication (JP-A) No. 2017-97519 discloses a technique that notifies a driver of a vehicle of preparations necessary for manual driving upon switching from automatic driving to the manual driving. The disclosed technique performs the switching from the automatic driving to the manual driving when all of the preparations are carried out, and stops the vehicle near a side strip automatically when any of the preparations is not carried out.

SUMMARY

An aspect of the technology provides a driving assist apparatus that includes: a driving mode setting calculator having driving modes, and configured to control a transition between the driving modes in accordance with a driving condition, in which the driving modes includes a manual driving mode, a first driving assist mode by which an automatic driving is performed on a basis of holding of a steering wheel by a driver, and a second driving assist mode by which the automatic driving is performed without the holding of the steering wheel by the driver; and a steering wheel holding detector configured to detect whether the driver holds the steering wheel or releases the steering wheel. The driving mode setting calculator causes the driving modes to make the transition from the first driving assist mode to the second driving assist mode, on a condition that the first driving assist mode is set as the driving modes and the steering wheel holding detector detects that the driver releases, from a state in which the driver holds the steering wheel, the steering wheel.

An aspect of the technology provides a driving assist apparatus that includes: a detector configured to detect whether a driver holds a steering wheel or releases the steering wheel; and circuitry configured to control a transition between driving modes in accordance with a driving condition, in which the driving modes includes a manual driving mode, a first driving assist mode by which an automatic driving is performed on a basis of holding of the steering wheel by the driver, and a second driving assist mode by which the automatic driving is performed without the holding of the steering wheel by the driver, and cause the driving modes to make the transition from the first driving assist mode to the second driving assist mode, on a condition that the first driving assist mode is set as the driving modes and the detector detects that the driver releases, from a state in which the driver holds the steering wheel, the steering wheel.

DETAILED DESCRIPTION

Figure 1:
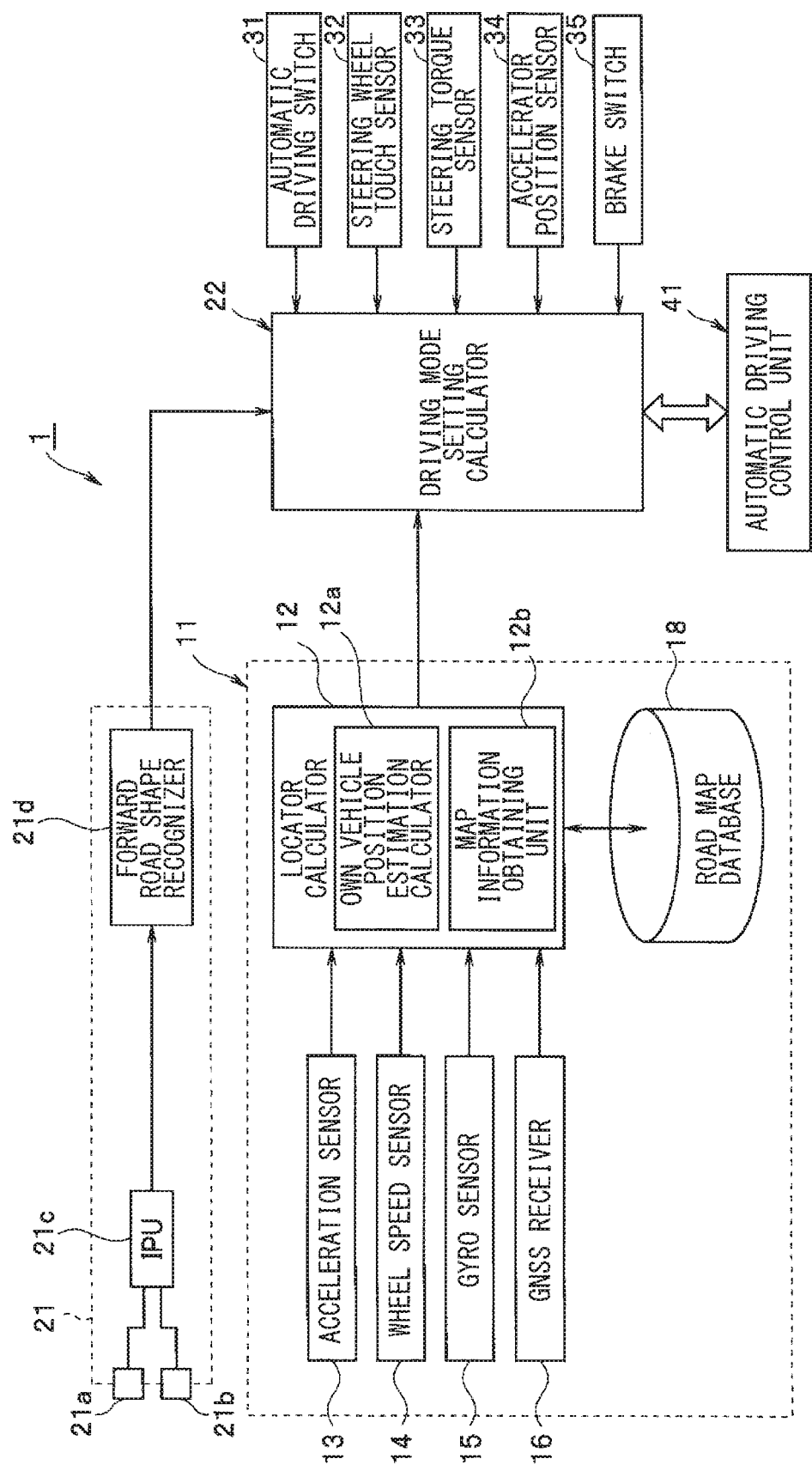
FIG. 1 schematically illustrates an example of a driving assist apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A technique disclosed in JP-A No. 2017-97519 notifies, in advance, a driver of a vehicle of switching from automatic driving to manual driving in order for the driver to address the manual driving promptly, in consideration of a fact that the driver obviously has to perform driving of the vehicle upon the switching from the automatic driving to the manual driving. This means that there is no necessity of notifying the driver of preparations upon switching from the manual driving to the automatic driving, because a driving operation to be performed by the driver is not required in this case.

It is, however, still necessary to notify, in advance, the driver of a guidance message such as "please take your hands off the steering wheel" upon causing driving modes to make a transition from a first driving assist mode to a second driving assist mode, for example. Under such circumstances, the technique disclosed in JP-A No. 2017-97519 is unable to address a situation where the driver does not take his/her hands off the steering wheel.

Further, JP-A No. 2017-97519 merely discloses the technique directed to the switching from the automatic driving to the manual driving. Hence, the technique disclosed in JP-A No. 2017-97519 is also unable to address a timing at which the driving modes are switched from the first driving assist mode to the second driving assist mode, even if the driver follows the advance notification provided by a controller and takes his/her hands off the steering wheel.

Accordingly, the technique disclosed in JP-A No. 2017-97519 is able to provide the advance notification upon the switching from the first or the second driving assist mode to the manual driving and deal with any control to be performed thereafter, but involves difficulties in making a smooth transition upon the switching from the first driving assist mode to the second driving assist mode even if the advance notification is provided.

It is desirable to provide a driving assist apparatus that makes it possible to appropriately determine a driver's intention upon making a transition between driving modes.

Figure 7A:
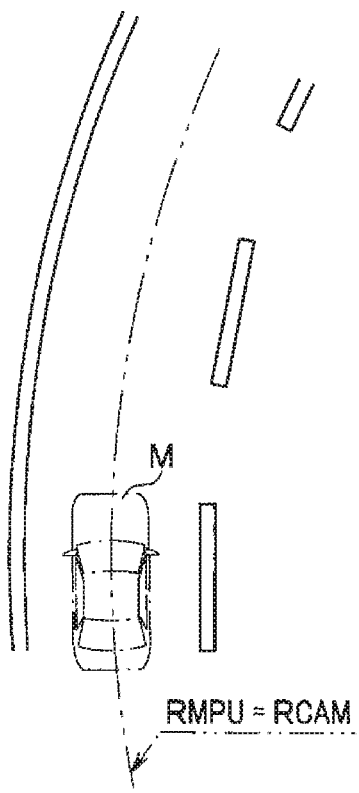
FIG. 7A describes a state in which a road curvature on a map and a road curvature recognized by a camera unit coincide with each other.
Figure 7B:
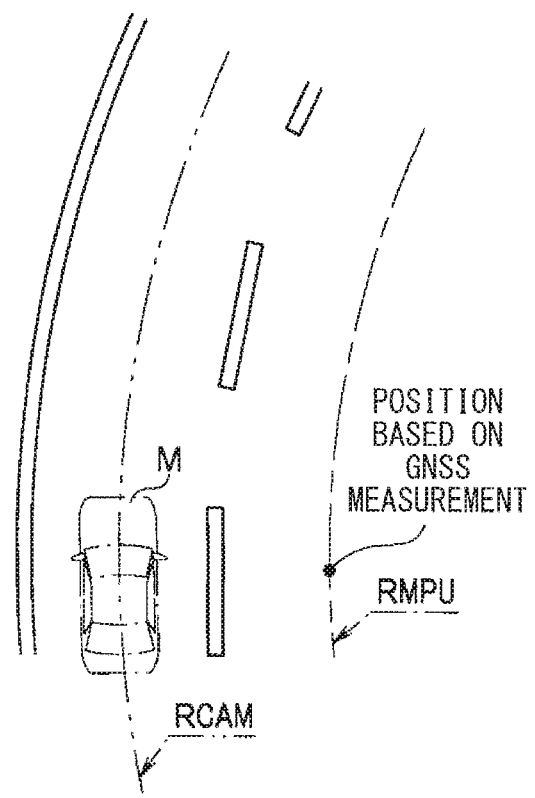
FIG. 7B describes a state in which the road curvature on the map and the road curvature recognized by the camera unit differ from each other.

Referring to FIG. 1, a driving assist apparatus 1 may be mounted on an own vehicle M illustrated in FIGS. 7A and 7B. The driving assist apparatus 1 may include a sensor unit that detects a shape of a road around the own vehicle M, such as a locator unit 11 and a camera unit 21. The locator unit 11 and the camera unit 21 may configure a completely-independent multiple system in which the locator unit 11 and the camera unit 21 do not rely on each other. In the example implementation, a curvature may be detected as the shape of the same road detected by both the locator unit 11 and the camera unit 21; however, the sensor unit may detect any other factor of the road as the road shape, besides the road curvature.

The locator unit 11 may estimate a position of the own vehicle M (i.e., an own vehicle position) on a road map, and acquire data on a road map of the road ahead of the own vehicle position. The camera unit 21 may recognize lane lines that define right and left of a lane along which the own vehicle M travels. Further, the camera unit 21 may determine a road curvature that is in the middle of the recognized lane lines, and detect a lateral-position deviation. The lateral-position deviation is a deviation in a vehicle-width direction of the own vehicle M and based on the middle of the recognized lane lines as a reference.

The locator unit 11 may include a locator calculator 12 and a high-accuracy road map database 18. The locator calculator 12, a forward road shape recognizer 21*d*, a driving mode setting calculator 22, and an automatic driving control unit 41 each may be configured by a known microcomputer and its peripherals. The microcomputer may include devices such as a central processing unit (CPU), a random-access memory (RAM), or a read-only memory (ROM). The ROM may contain programs to be executed by the CPU and fixed data such as a base map. In one implementation, the high-accuracy road map database 18 may serve as a "storage". In one implementation, the driving mode setting calculator 22 may serve as a "driving mode setting calculator". The forward road shape recognizer 21*d*, the driving mode setting calculator 22, and the automatic driving control unit 41 are described later in greater detail.

The locator calculator 12 may be coupled, at its input side, to sensors and devices that detect and obtain parameters that are necessary upon estimating the own vehicle position of the own vehicle M. Non-limiting examples of such sensors and devices may include: an acceleration sensor 13 that detects forward-rear acceleration acting on the own vehicle M; a wheel speed sensor 14 that detects a speed of rotation, i.e., a wheel speed, of a corresponding wheel among a front-right wheel, a front-left wheel, a rear-right wheel, and a rear left wheel; a gyro sensor 15 that detects an angular velocity or angular acceleration of the own vehicle M; and a global navigation satellite system (GNSS) receiver 16 that receives positioning signals transmitted from a plurality of positioning satellites.

The locator calculator 12 may include an own vehicle position estimation calculator 12*a* and a map information obtaining unit 12*b*. The own vehicle position estimation calculator 12*a* may estimate the own vehicle position. The map information obtaining unit 12*b* may identify a position of the own vehicle M through map matching in which the estimated own vehicle position is matched on the road map, and may obtain information on the road shape ahead of the thus-identified position.

The high-accuracy road map database 18 may be a large-capacity storage such as a hard disk drive (HDD), and contain highly-accurate road map information, i.e., a dynamic map. The high-accuracy road map information may contain lane data that is necessary for performing automatic driving. Non-limiting examples of the lane data may include: data on a width of a lane; data on coordinates of a middle position of the lane; data on azimuth in a traveling direction of the lane; and data on a speed limit. The lane data may be set for each lane on the road map on a several-meter basis.

The map information obtaining unit 12*b* may obtain information on the road map of a current location from the road map information stored in the high-accuracy road map database 18. Further, from the thus-obtained road map information, the map information obtaining unit 12*b* may obtain route map information on the basis of, for example, a destination set by a driver for the automatic driving. The route map information may be map information related to a route from the own vehicle position (i.e., the current location) estimated by the own vehicle position estimation calculator 12a to the destination. The map information obtaining unit 12b may transmit the thus-obtained route map information (i.e., the lane data on the route map and its peripheral information) to the own vehicle position estimation calculator 12a.

The own vehicle position estimation calculator 12a may obtain coordinates of the position of the own vehicle M on the basis of the positioning signals received by the GNSS receiver 16. Further, the own vehicle position estimation calculator 12a may perform map matching of the obtained position coordinates onto the route map information to thereby estimate the own vehicle position (i.e., the current location) on the road map and to thereby identify a lane along which the own vehicle M travels. The own vehicle position estimation calculator 12a may also obtain the road shape of the traveling lane of the own vehicle M in the route map information, and sequentially store the obtained road shape of the traveling lane. In other words, in the example implementation, the own vehicle position estimation calculator 12a may obtain a road curvature RMPU[1/m] of the middle of the lane, and sequentially store the obtained road curvature RMPU. Hereinafter, the thus-obtained road curvature RMPU is referred to as a "map curvature RMPU".

Further, the own vehicle position estimation calculator 12a may switch to an autonomous navigation in an environment where the reception of the valid positioning signals from the positioning satellites is difficult due to, for example, a decrease in sensitivity of the GNSS receiver 16. Non-limiting examples of such an environment may include traveling inside a tunnel. The autonomous navigation may estimate the own vehicle position on the basis of one or more of: a vehicle speed obtained on the basis of the wheel speed detected by the wheel speed sensor 14; the angular velocity or the angular acceleration detected by the gyro sensor 15; and the forward-rear acceleration detected by the acceleration sensor 13. By performing the autonomous navigation, the own vehicle position estimation calculator 12a may estimate the own vehicle position on the road map, and obtain the curvature (i.e., the map curvature) RMPU of the road long which the own vehicle M travels.

The camera unit 21 may include a vehicle-mounted camera, an image processing unit (IPC) 21c, and the forward road shape recognizer 21d. The vehicle-mounted camera may be provided inside a vehicle interior of the own vehicle M and fixed at an upper-middle part of the front of the vehicle interior. The vehicle-mounted camera may be a stereo camera that includes a main camera 21a and a sub camera 21b. The main camera 21a and the sub camera 21b may be disposed at their respective positions that are symmetrical across the middle in a width direction of the own vehicle M. The IPU 21c in the camera unit 21 may perform a predetermined image process on information of images of a traveling environment ahead of the own vehicle M which are captured by the vehicle-mounted camera (e.g., captured by the respective main and the sub cameras 21a and 21b). Further, the IPU 21c may transmit the processed traveling environment image information to the forward road shape recognizer 21d.

The forward road shape recognizer 21d may determine the road shape of the road along which the own vehicle M is to travel, on the basis of the traveling environment image information received from the IPU 21c. In the example implementation, on the basis of the traveling environment image information, the forward road shape recognizer 21d may determine the road curvature [1/m] of the lane lines that define right and left of the lane, and may determine a width, or a lane width, between the right and the left lane lines. Any of various known methods of determining a road curvature and a lane width may be used to determine the road curvature [1/m] of the right and the left lane lines and the lane width therebetween. For example, in one example implementation, the road curvature may be determined through recognizing right and left lane lines on the basis of the traveling environment image information and determining, for each predetermined section, the curvature of each of the right and the left lane lines. The right and the left lane lines may be recognized through a binarization process that utilizes a difference in luminance. The curvature of each of the right and the left lane lines may be determined through, for example, a curve-approximating expression that is based on a least-square method. Further, in one example implementation, the lane width may be calculated from a difference between the thus-determined curvatures of the respective right and the left lane lines. On the basis of the curvature of the respective right and the left lane lines and the lane width, the forward road shape recognizer 21d may thereby determine a road curvature RCAM[1/m] of the middle of the lane, and sequentially store the thus-determined road curvature RCAM. Hereinafter, the road curvature RCAM is referred to as a "camera curvature RCAM".

The map curvature RMPU obtained by the own vehicle position estimation calculator 12a and the camera curvature RCAM estimated by the forward road shape recognizer 21d may be supplied to the driving mode setting calculator 22. It is to be noted that the locator unit 11 and the camera unit 21 may configure the completely-independent multiple system.

The driving mode setting calculator 22 may be coupled, at its input side, to sensors and devices that detect and obtain parameters that are necessary upon determining a driving mode. In one implementation, the driving mode setting calculator 22 may serve as the "driving mode setting calculator". Non-limiting examples of such sensors and devices may include an automatic driving switch 31, a steering wheel touch sensor 32, a steering torque sensor 33, an accelerator position sensor 34, and a brake switch 35. The automatic driving switch 31 may allow the driver to turn on or off the automatic driving. The steering wheel touch sensor 32 may be provided at a location, of a steering wheel, which is to be held by the driver, and may be turned on upon detecting the holding of the steering wheel by the driver. In one implementation, the steering wheel touch sensor 32 may serve as a "steering wheel holding detector". The steering torque sensor 33 may be provided at a steering shaft, and may detect steering torque Tst derived from an operation of the steering wheel performed by the driver. In one implementation, the steering torque sensor 33 may serve as a "steering wheel operation detector". The accelerator position sensor 34 may detect an accelerator position θacc that corresponds to an amount of pressing down of an accelerator pedal. In one implementation, the accelerator position sensor 34 may serve as an "accelerator operation detector". The brake switch 35 may detect an operation of pressing down of a brake pedal performed by the driver, and may be turned on upon detecting the operation of pressing down of the brake pedal. In one implementation, the brake switch 35 may serve as a "brake operation detector".

The driving mode setting calculator 22 may compare the map curvature RMPU estimated by the own vehicle position estimation calculator 12a and the camera curvature RCAM obtained by the forward road shape recognizer 21d. The map curvature RMPU here may be directed to a location ahead of the own vehicle position. In one example implementation, the driving mode setting calculator 22 may perform the comparison on a constant basis. For example, the driving mode setting calculator 22 may check a degree of coincidence, i.e., reliability, in percent [%] between the map curvature RMPU and the camera curvature RCAM, on the basis of the own vehicle position on the map and the own vehicle position derived from the actual driving each as a reference. The driving mode setting calculator 22 may check the degree of coincidence between the map curvature RMPU and the camera curvature RCAM that are both derived from the same region ahead of the own vehicle M and away from the own vehicle M by a predetermined distance. The driving mode setting calculator 22 may determine that the map curvature RMPU and the camera curvature RCAM coincide with each other when the degree of coincidence is equal to or greater than a preset threshold, and may determine that the map curvature RMPU and the camera curvature RCAM does not coincide with each other when the degree of coincidence is less than the preset threshold. In one example implementation, the threshold may be the degree of coincidence in a range from 95% to 99%.

The driving mode setting calculator 22 may allow the automatic driving to be continued or may switch the driving modes from manual driving to the automatic driving, when determining that the map curvature RMPU and the camera curvature RCAM coincide with each other. The driving mode setting calculator 22 may notify, in advance, the driver of the switching of the driving modes by means of any unillustrated notifying device, when switching the driving modes.

The driving mode setting calculator 22 may switch the driving modes from the automatic driving to the manual driving when determining that the map curvature RMPU and the camera curvature RCAM does not coincide with each other, in consideration of the low degree of coincidence or the low reliability in this case. The driving mode setting calculator 22 may switch the driving modes from the automatic driving to the manual driving after notifying, in advance, the driver of the switching from the automatic driving to the manual driving by means of any unillustrated notifying device.

In the example implementation, the driving modes include a manual driving mode, a first driving assist mode, and a second driving assist mode. The first driving assist mode and the second driving assist mode may both fall into the category of the "automatic driving" described above. Note that the first driving assist mode is a driving assist mode in which the driver is required to take over a driving operation when continuation of the automatic driving is determined as being difficult, and the second driving assist mode is a driving assist mode in which the driver is not required to take over the driving operation even when the continuation of the automatic driving is determined as being difficult.

The first driving assist mode and the second driving assist mode may be the same as each other in that they cause the own vehicle M to automatically travel along a target traveling path along which the own vehicle M is to travel, i.e., they perform the automatic driving. The first driving assist mode, however, is based on the premise that the driver holds the steering wheel, whereas the second driving assist mode is not based on the premise that the driver holds the steering wheel. This means that the automatic driving based on the second driving assist mode causes the driver to take over the driving operation or performs an avoidance control, when the continuation of the automatic driving becomes difficult.

For example, the avoidance control may include automatically stopping the own vehicle M near a side strip or any other avoiding location.

In the example implementation, the following example transitions in driving mode may be made even in a state where the map curvature RMPU and the camera curvature RCAM coincide with each other, on a condition that an intentional operation performed by the driver is detected. For example, the transition may be made from the second driving assist mode to the first driving assist mode, and the transition may be further made from the first driving assist mode to the manual driving mode. In addition, in the example implementation, the following example transitions in driving mode may be made on a condition that the intentional operation performed by the driver is released. For example, the transition may be made from the manual driving mode to the first driving assist mode, and the transition may be further made from the first driving assist mode to the second driving assist mode. Such an intentional operation performed by the driver may be determined on the basis of one or more parameters detected by the automatic driving switch 31, the steering wheel touch sensor 32, the steering torque sensor 33, the accelerator position sensor 34, and the brake switch 35.

The automatic driving control unit 41 may be so coupled to the driving mode setting calculator 22 as to be able to communicate freely and bidirectionally with the driving mode setting calculator 22. The automatic driving control unit 41 may execute any of the driving modes including the manual driving mode, the first driving assist mode, and the second driving assist mode set by the driving mode setting calculator 22.

Figure 2:
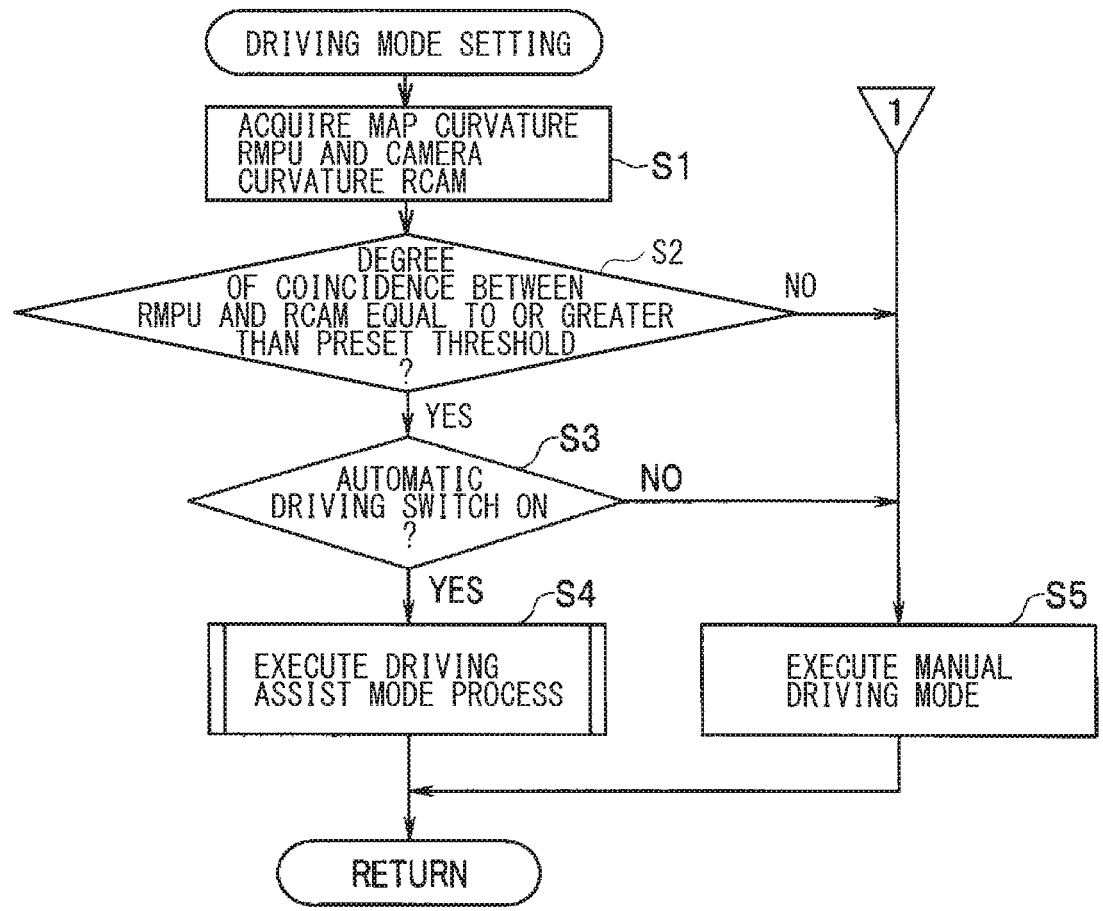
FIG. 2 is a flowchart illustrating an example of a driving mode setting routine.

FIG. 2 is a flowchart illustrating an example of a driving mode setting routine. For example, the driving mode setting calculator 22 may set the driving mode in accordance with the driving mode setting routine illustrated by way of example in FIG. 2. In accordance with the driving mode setting routine, at step S1, the driving mode setting calculator 22 may first acquire the map curvature RMPU obtained by the own vehicle position estimation calculator 12*a* and the camera curvature RCAM obtained through the recognition performed by the forward road shape recognizer 21*d*. Thereafter, at step S2, the driving mode setting calculator 22 may determine the degree of coincidence between the map curvature RMPU and the camera curvature RCAM. For example, the driving mode setting calculator 22 may determine the degree of coincidence on the basis of a preset calculation method or a map. The flow may proceed to step S3 when the degree of coincidence is equal to or greater than the preset threshold (step S2: YES), by evaluating that the reliability of each of the map curvature RMPU and the camera curvature RCAM is high and that the same road shape is recognized accordingly. The threshold may be the degree of coincidence in a range from 95% to 99%. The flow may proceed to step S5 when the degree of coincidence is less than the preset threshold (step S2: NO), by evaluating that the reliability of one or both of the map curvature RMPU and the camera curvature RCAM is low.

For example, as illustrated in FIG. 7A, the driving mode setting calculator 22 may evaluate that the own vehicle M actually travels along the target traveling path when the map curvature RMPU obtained by the locator unit 11, e.g., by the own vehicle position estimation calculator 12*a*, and the camera curvature RCAM obtained through the recognition performed by the forward road shape recognizer 21*d* substantially coincide with each other.

For example, as illustrated in FIG. 7B, the driving mode setting calculator 22 may evaluate that the degree of coincidence, or the reliability, between the map curvature RMPU and the camera curvature RCAM is low (i.e., is less than the threshold), when the locator unit 11 erroneously recognizes the map curvature RMPU of an adjacent lane as the road curvature of the traveling path of the own vehicle M. The locator unit 11 may possibly recognizes the map curvature RMPU erroneously when the map matching of the position, derived from the positioning performed by the GNSS receiver 16, is performed onto the adjacent lane due to an error. The driving mode setting calculator 22 may evaluate that the degree of coincidence, or the reliability, is low, when the forward road shape recognizer 21*d* fails to obtain the camera curvature RCAM due to traveling under a poor-visibility situation such as rainfall.

After evaluating that the degree of coincidence is high, i.e., is equal to or greater than the threshold (step S2: YES), the driving mode setting calculator 22 may check, at step S3, whether the automatic driving switch 31 is turned on. The automatic driving switch 31 may be turned on when the driver selects to set the automatic driving. The flow may proceed to step S4 when the automatic driving switch 31 is on (step S3: YES). At step S4, the driving mode setting calculator 22 may execute a driving assist mode process, following which the driving mode setting calculator 22 may end the routine or cause the routine to return to the start of the routine. The flow may proceed to step S5 when the automatic driving switch 31 is off (step S3: NO).

When the flow proceeds to step S5 from step S2 or from step S3, the driving mode setting calculator 22 may execute the manual driving mode, following which the driving mode setting calculator 22 may end the routine or cause the routine to return to the start of the routine. The manual driving mode thus selected as the driving mode may cause the target traveling path to be displayed on an unillustrated display. The target traveling path may be set by a known navigation function that guides the own vehicle M to the destination. The driver may thus drive the own vehicle M by his/her own driving while following the displaying performed on the display, a voice guidance, or both.

Figure 3:
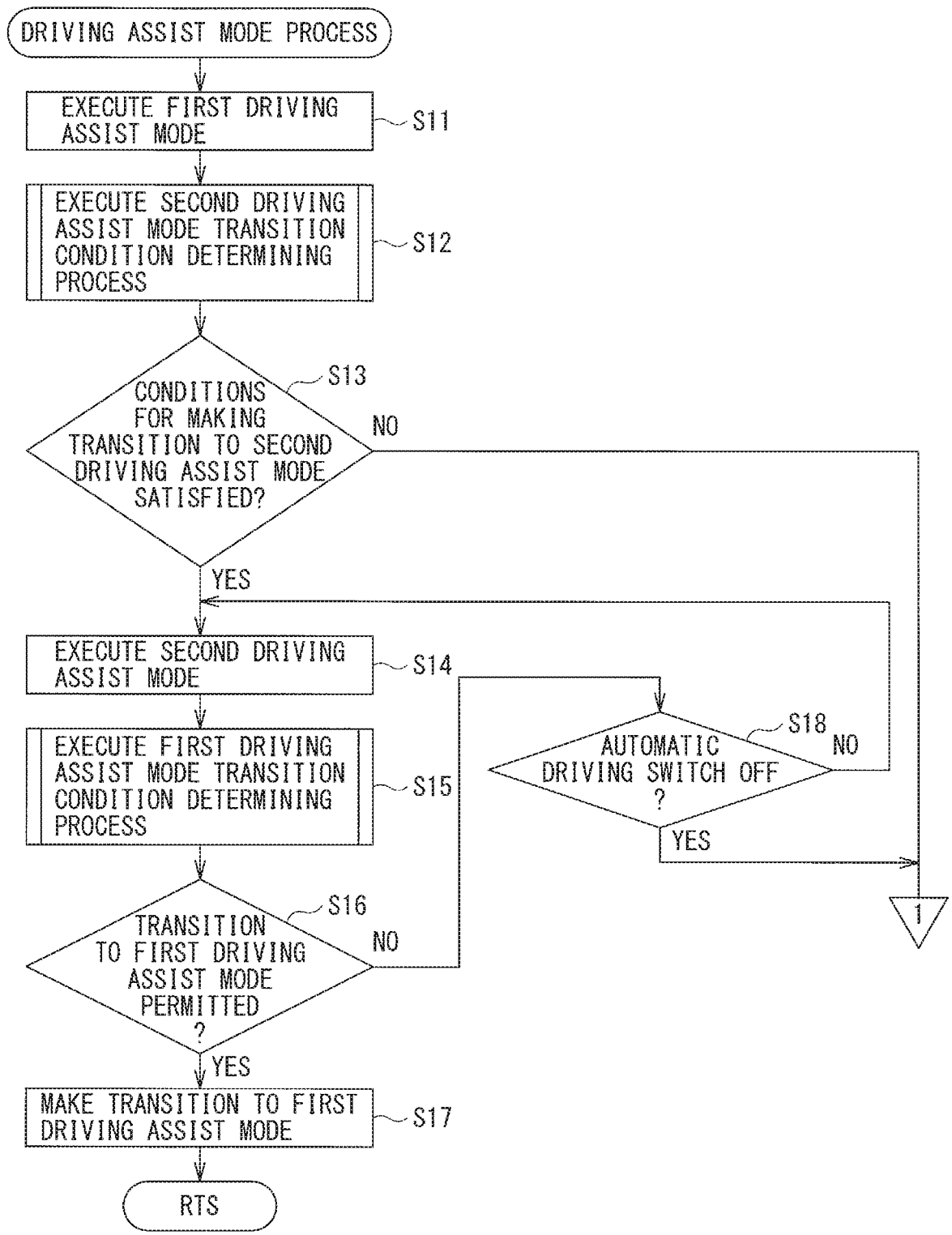
FIG. 3 is a flowchart illustrating an example of a subroutine related to a driving assist mode process.

The driving mode setting calculator 22 may execute the driving assist mode process performed at step S4 in accordance with a subroutine related to the driving assist mode process illustrated by way of example in FIG. 3. In accordance with the subroutine, at step S11, the driving mode setting calculator 22 may first execute the first driving assist mode. As described previously, the first driving assist mode is based on the premise that the driver holds the steering wheel. Accordingly, upon the initial execution of the subroutine following the turning on of the automatic driving switch 31, the driving mode setting calculator 22 may notify the driver of starting of the automatic driving and of an instruction to keep holding the steering wheel.

The driving mode setting calculator 22 may also notify the driver of the instruction to hold the steering wheel upon the initial execution of the subroutine, when making the transition from the second driving assist mode to the first driving assist mode as described later in greater detail. In one example implementation, whether or not the driver holds the steering wheel may be determined through checking whether or not the steering wheel touch sensor 32 is on. The first driving assist mode and an example control of the automatic driving performed in accordance with the first driving assist mode have been described above and they will not be described in detail here.

Basically, in the example implementation, the driving mode setting calculator 22 may cause the driving modes to make the transition to the second driving assist mode, when the driving mode setting calculator 22 evaluates that the degree of coincidence between the map curvature RMPU and the camera curvature RCAM is high, and thus evaluates that the road information on the map obtained by the locator unit 11 and the road information obtained through the recognition performed by the forward road shape recognizer 21*d* indicate the traveling path along which the own vehicle M actually travels. Upon making the transition to the second driving assist mode, the driving mode setting calculator 22 may first cause the driving modes to make the transition from the manual driving mode to the first driving assist mode, and may thereafter cause the driving modes to make the transition from the first driving assist mode to the second driving assist mode. Hence, in the example implementation, the driving mode setting calculator 22 may cause the driving modes to make the transition in this way in a stepwise fashion. Accordingly, the driver is not required to deal with the transition suddenly upon the transition from the manual driving to the automatic driving. For example, the driver is not required to suddenly take his/her hands off the steering wheel upon the transition from the manual driving to the automatic driving. Hence, the driver is able to address the transition with leeway.

Figure 4:
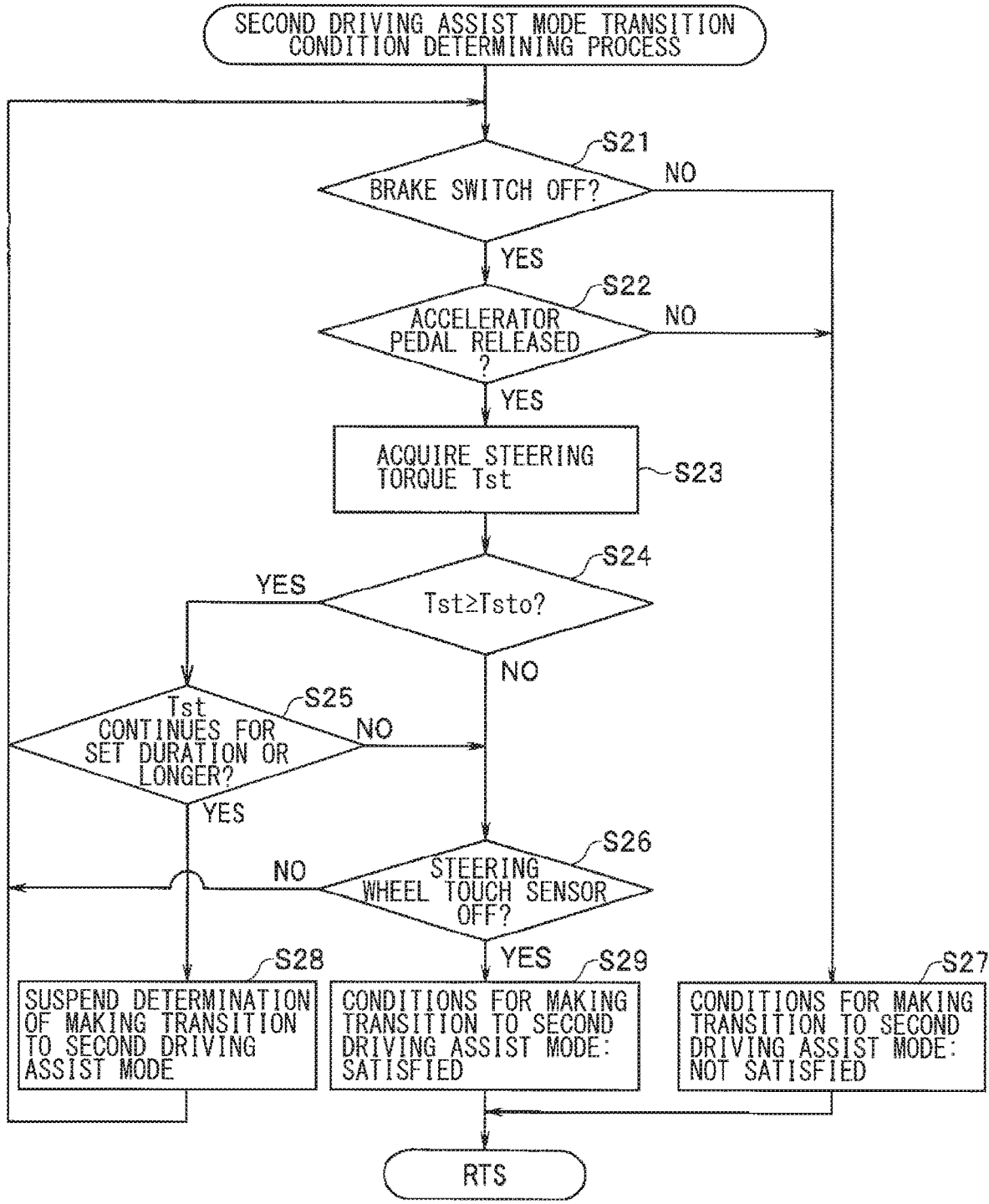
FIG. 4 is a flowchart illustrating an example of a subroutine related to a process of determining conditions for making a transition to a second driving assist mode.

Thereafter, the flow may proceed to step S12 at which the driving mode setting calculator 22 may determine conditions for making the transition to the second driving assist mode. The driving mode setting calculator 22 may make the determination at step S12 in accordance with a subroutine related to a process of determining the conditions for making the transition to the second driving assist mode (which may be referred to as a "second driving assist mode transition condition determining process") illustrated by way of example in FIG. 4. Note that, upon the initial execution of this subroutine during the execution of the first driving assist mode, the driving mode setting calculator 22 may notify the driver of causing the driving modes to make the transition from the first driving assist mode to the second driving assist mode. The driving mode setting calculator 22 may also notify, upon the initial execution of this subroutine during the execution of the first driving assist mode, the driver of an instruction to take driver's hands off the steering wheel and an instruction to take driver's foot off the accelerator pedal or the brake pedal.

First, at step S21, the driving mode setting calculator 22 may check whether the brake switch 35 is turned on. The flow may proceed to step S22 when the brake switch 35 is off (step S21: NO). The flow may proceed to step S27 when the brake switch 35 is on (step S21: YES). At step S22, the driving mode setting calculator 22 may check whether the accelerator pedal is released. In one example implementation, the driving mode setting calculator 22 may perform the checking on the basis of the accelerator position θacc detected by the accelerator position sensor 34. The flow may proceed to step S23 when the driving mode setting calculator 22 determines that the accelerator pedal is released (step S22: YES). In one example implementation, the driving mode setting calculator 22 determines that the accelerator pedal is released when the accelerator position θacc is equal to 0 (zero) degree (θacc=0 [deg.]). The flow may proceed to step S27 when the driving mode setting calculator 22 determines that the accelerator pedal is not released, i.e., is pressed down (step S22: NO). In one example implementation, the driving mode setting calculator 22 determines that the accelerator pedal is not released when the accelerator position θacc is greater than 0 degree (θacc>0 [deg.]).

When the flow proceeds to step S27 from step S21 or from step S22, the driving mode setting calculator 22 may determine that the conditions for making the transition to the second driving assist mode are not satisfied, following which the flow may proceed to step S13 of FIG. 3.

At step S23, the driving mode setting calculator 22 may acquire the steering torque Tst detected by the steering torque sensor 33. Thereafter, at step S24, the driving mode setting calculator 22 may compare the steering torque Tst acquired at step S23 with a preset override determination torque value Tsto. The flow may proceed to step S25 when the steering torque Tst is equal to or greater than the override determination torque value Tsto (Tst≥Tsto) (step S24: YES), on the premise that that the driver intentionally operates the steering wheel. When the flow proceeds from step S24 to step S25, a duration in which the steering torque Tst is equal to or greater than the override determination torque value Tsto may be measured. The flow may proceed to step S26 when the steering torque Tst is less than the override determination torque value Tsto (Tst<Tsto) (step S24: NO), on the premise that the driver does not intentionally operate the steering wheel and that the driver's operation is no more than simply holding the steering wheel.

At step S25, the driving mode setting calculator 22 may check whether a state in which the steering torque Tst is equal to or greater than the override determination torque value Tsto (Tst≥Tsto) continues for a set duration or longer. The flow may proceed to step S28 when the state in which the steering torque Tst is equal to or greater than the override determination torque value Tsto (Tst≥Tsto) continues for the set duration or longer (step S25: YES). At step S28, the driving mode setting calculator 22 may suspend the determination of making the transition to the second driving assist mode. In the example implementation, the determination of the conditions for making the transition to the second driving assist mode may be suspended for a predetermined period of time from the completion of the intentional steering performed by the driver, or until the own vehicle M travels over a predetermined traveling distance from the completion of the intentional steering performed by the driver. Thereafter, the flow may return to step S21 to perform the determination of the conditions for making the transition to the second driving assist mode again. In the example implementation, the flow may return to step S21 when the predetermined period of time has elapsed from the completion of the intentional steering performed by the driver, or when the own vehicle M has traveled over the predetermined traveling distance from the completion of the intentional steering performed by the driver.

As described previously, in the example implementation, the driving mode setting calculator 22 may basically cause the driving modes to make the transition to the second driving assist mode, when the driving mode setting calculator 22 evaluates that the degree of coincidence between the map curvature RMPU and the camera curvature RCAM is high. Accordingly, the driving mode setting calculator 22 refrains from suddenly making the transition to the manual driving mode even when the driver intentionally operates the steering wheel. In addition, the driving mode setting calculator 22 determines the conditions for making the transition to the second driving assist mode again after the predetermined period of time has elapsed from the completion of the intentional steering performed by the driver, or after the own vehicle M has traveled over the predetermined traveling distance from the completion of the intentional steering performed by the driver. This makes it possible to perform the determination of the conditions for making the transition which better follows the driver's intention.

Note that the flow may proceed to step S27 at which the driving mode setting calculator 22 may determine that the conditions for making the transition to the second driving assist mode are not satisfied, when the driver intentionally presses down on the brake pedal at step S21 or the driver intentionally pressed down on the accelerator pedal at step S22. One reason for this is that, in such cases of steps S21 and S22, the driver often holds the steering wheel together or operates the steering wheel together and may possibly attempt to avoid a risk accordingly. Hence, when the flow proceeds to step S27 from step S21 or from step S22, the driving mode setting calculator 22 may determine that the conditions for making the transition to the second driving assist mode are not satisfied, on the premise that there is a possible emergency. After determining that the conditions for making the transition to the second driving assist mode are not satisfied at step S27, the flow may proceed to step S13 of FIG. 3 as described above.

Meanwhile, at step S25, the flow may proceed to step S26 when the state in which the steering torque Tst is equal to or greater than the override determination torque value Tsto (Tst≥Tsto) does not continue for the set duration or longer (step S25: NO). In other words, the flow may proceed to step S26 when the duration in which Tst≥Tsto holds true is shorter than the set duration (step S25: NO). When the flow proceeds to step S26 from step S24 or from step S25, the driving mode setting calculator 22 may check whether the steering wheel touch sensor 32 is off. The flow may return to step S21 when the steering wheel touch sensor 32 is on (step S26: NO), on the premise that the driver holds the steering wheel. This routine may be executed repeatedly until the driver take his/her hands off the steering wheel.

Thereafter, the flow may proceed to step S29 when the steering wheel touch sensor 32 is turned off, i.e., the driver takes his/her hands off the steering wheel. In other words, the flow may proceed to step S29 when the driving mode setting calculator 22 determines that the driver releases the steering wheel. At step S29, the driving mode setting calculator 22 may determine that the conditions for making the transition to the second driving assist mode are satisfied, following which the flow may proceed to step S13 of FIG. 3.

Referring to FIG. 3, at step S13, the driving mode setting calculator 22 may check whether the conditions for making the transition to the second driving assist mode are satisfied. The flow may proceed to step S14 when the conditions for making the transition to the second driving assist mode are satisfied (step S13: YES). When the conditions for making the transition to the second driving assist mode are not satisfied (step S13: NO), the flow may proceed to step S5 of FIG. 2. At step S5, the driving mode setting calculator 22 may cause the driving modes to make the transition to the manual driving mode after notifying the driver of causing the driving modes to make the transition to the manual driving mode, following which the driving mode setting calculator 22 may end the routine or cause the routine to return to the start of the routine.

At step S14, the driving mode setting calculator 22 may execute the second driving assist mode, following which the flow may proceed to step S15. In other words, at step S14, the driving mode setting calculator 22 may cause the driving modes to make the transition from the first driving assist mode to the second driving assist mode. The second driving assist mode and an example control of the automatic driving performed in accordance with the second driving assist mode have been described above and they will not be described in detail here.

Figure 5:
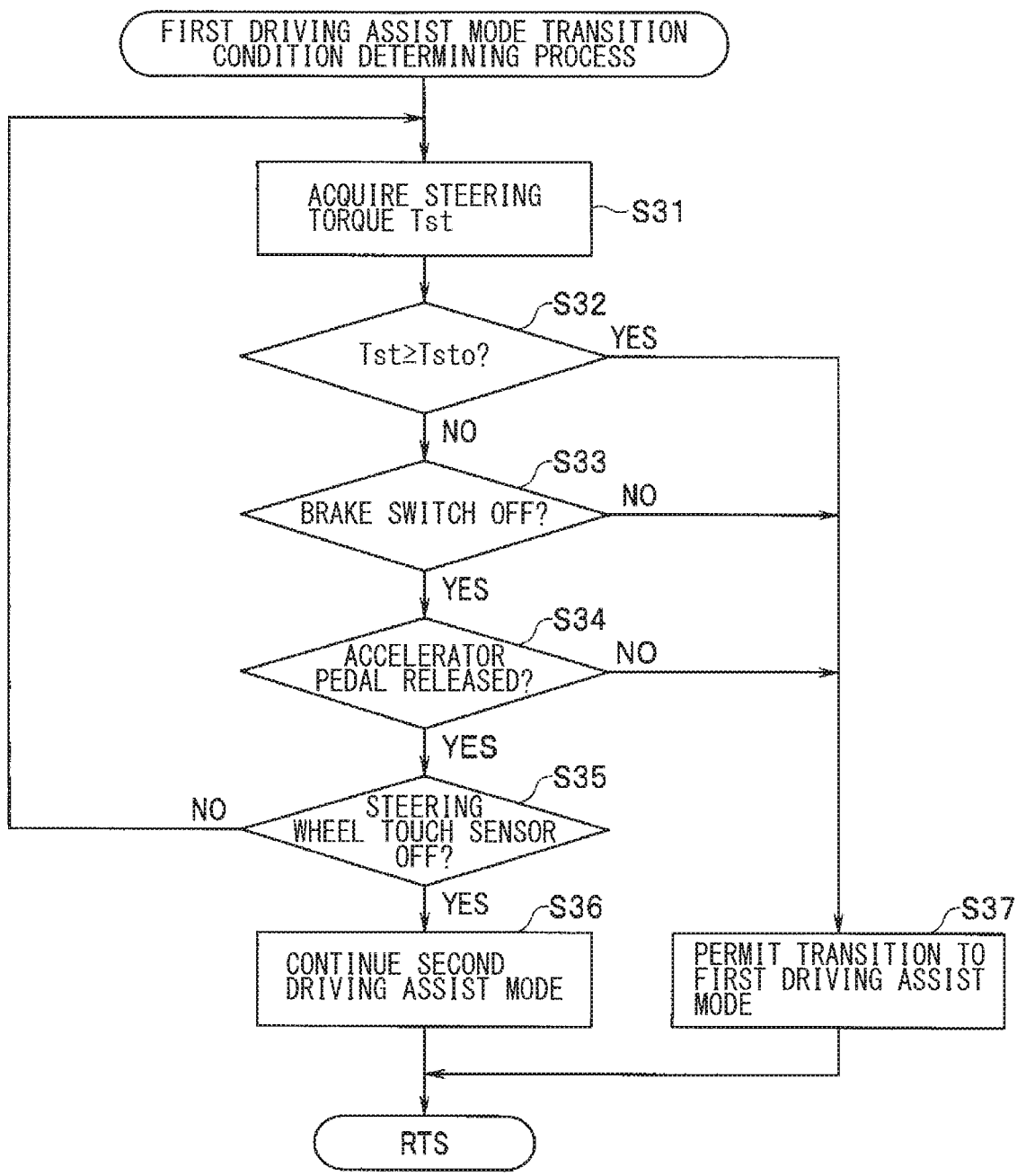
FIG. 5 is a flowchart illustrating an example of a subroutine related to a process of determining conditions for making a transition to a first driving assist mode.

Thereafter, the flow may proceed to step S15 at which the driving mode setting calculator 22 may determine conditions for making the transition to the first driving assist mode. The driving mode setting calculator 22 may make the determination at step S15 in accordance with a subroutine related to a process of determining the conditions for making the transition to the first driving assist mode (which may be referred to as a "first driving assist mode transition condition determining process") illustrated by way of example in FIG. 5. In accordance with the subroutine, at step S31, the driving mode setting calculator 22 may first acquire the steering torque Tst detected by the steering torque sensor 33. Thereafter, at step S32, the driving mode setting calculator 22 may compare the steering torque Tst acquired at step S32 with the preset override determination torque value Tsto.

The flow may proceed to step S33 when the steering torque Tst is less than the override determination torque value Tsto (Tst<Tsto) (step S32: NO), on the premise that the driver does not intentionally operate the steering wheel and that the driver's operation is no more than simply holding the steering wheel. The flow may proceed to step S37 when the steering torque Tst is equal to or greater than the override determination torque value Tsto (Tst≥Tsto) (step S32: YES), on the premise that that the driver intentionally operates the steering wheel.

At step S33, the driving mode setting calculator 22 may check whether the brake switch 35 is turned on. The flow may proceed to step S37 when the brake switch 35 is on (step S33: NO), on the premise that the driver intentionally performs a brake operation. The flow may proceed to step S34 when the brake switch 35 is off (step S33: YES). At step S34, the driving mode setting calculator 22 may check whether the accelerator pedal is released, for example, on the basis of the accelerator position θacc detected by the accelerator position sensor 34. The flow may proceed to step S35 when the driving mode setting calculator 22 determines that the accelerator pedal is released (step S34: YES), for example, on a condition that the accelerator position θacc is equal to 0 degree (θacc=0 [deg.]). The flow may proceed to step S37 when the driving mode setting calculator 22 determines that the accelerator pedal is not released, i.e., is pressed down (step S34: NO), for example, on a condition that the accelerator position θacc is greater than 0 degree (θacc>0 [deg.]).

At step S35, the driving mode setting calculator 22 may check whether the steering wheel touch sensor 32 is off. The flow may proceed to step S36 as it is when the steering wheel touch sensor 32 is off (step S35: YES). The flow may return to step S31 to perform the determination of the conditions for making the transition to the first driving assist mode again when the steering wheel touch sensor 32 is on (step S35: NO), on the premise that it is difficult to clearly discriminate the driver's intention. For example, it is difficult to discriminate clearly whether the driver simply puts his/her hands on the steering wheel or is going to perform an override operation. Note that the first driving assist mode may be continued as the driving mode while this subroutine is executed repeatedly.

At step S36, the driving mode setting calculator 22 may determine to continue the second driving assist mode, following which the flow may proceed to step S16 of FIG. 3. Note that the driving mode setting calculator 22 may determine to permit the transition to the first driving assist mode when the flow proceeds to step S37 from any of steps S32 to S34. The flow may proceed to step S16 of FIG. 3 after permitting the transition to the first driving assist mode at step S37.

Referring to FIG. 3, at step S16, the driving mode setting calculator 22 may check whether the transition to the first driving assist mode is permitted. The flow may proceed to step S17 when the transition to the first driving assist mode is permitted (step S16: YES). At step S17, the driving mode setting calculator 22 may cause the driving modes to make the transition to the first driving assist mode after notifying the driver of causing the driving modes to make the transition to the first driving assist mode, following which the driving mode setting calculator 22 may end the routine or cause the routine to return to the start of the routine.

At step S16, the flow may proceed to step S18 when the transition to the first driving assist mode is not permitted (step S16: NO), i.e., when the driving mode setting calculator 22 determines to continue the second driving assist mode at step S36. At step S18, the driving mode setting calculator 22 may check whether the automatic driving switch 31 is turned off. The flow may proceed to step S5 of FIG. 2 when the automatic driving switch 31 is off (step S18: YES). At step S5, the driving mode setting calculator 22 may cause the driving modes to make the transition to the manual driving mode after notifying the driver of ending the automatic driving, following which the driving mode setting calculator 22 may end the routine or cause the routine to return to the start of the routine. At step S18, the flow may return to step S14 to continue the automatic driving in accordance with the second driving assist mode, when the automatic driving switch 31 is kept turned on (step S18: NO).

Figure 6:
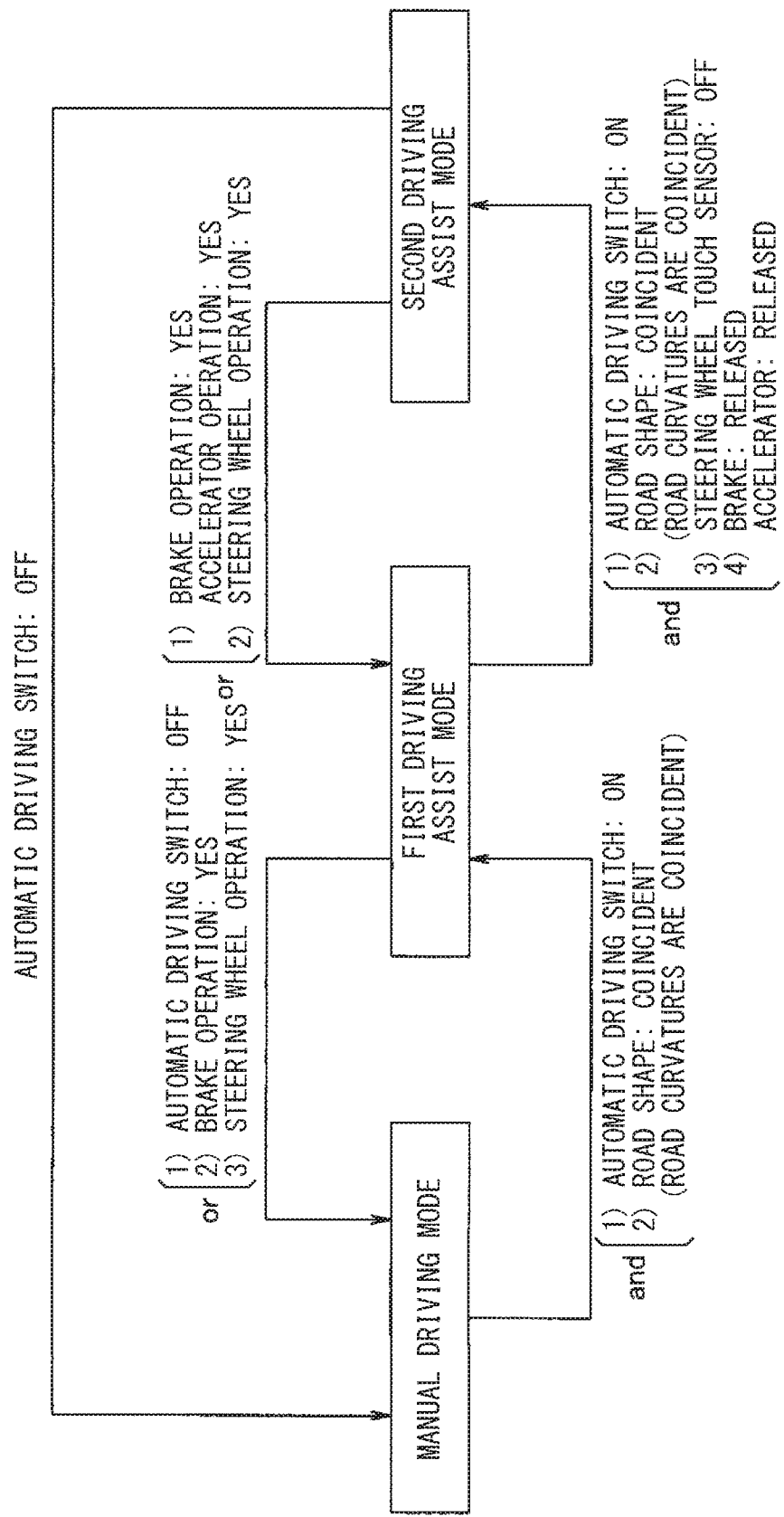
FIG. 6 illustrates conditions for making transitions between the driving modes and illustrates transitions in states of the driving modes.

FIG. 6 schematically illustrates example conditions, to be determined by the driving mode setting calculator 22, for making the transitions between the driving modes, including the manual driving mode, the first driving assist mode, and the second driving assist mode.

In accordance with any of the driving modes including the manual driving mode, the first driving assist mode, and the second driving assist mode set by the driving mode setting calculator 22, the automatic driving control unit 41 may execute the corresponding driving mode set by the driving mode setting calculator 22.

According to the foregoing example implementation, the driving mode setting calculator 22 may determine one or more conditions for making the transition from the first driving assist mode to the second driving assist mode after the driving mode setting calculator 22 sets the first driving assist mode as the driving mode. Upon determining the one or more conditions, the driving mode setting calculator 22 may refrain from determining immediately that making the transition to the second driving assist mode is not satisfied, when the driving mode setting calculator 22 determines that the driver continues to hold the steering wheel, i.e., the steering wheel touch sensor 32 is on. Instead of determining immediately that making the transition to the second driving assist mode is not satisfied, the driving mode setting calculator 22 may check again one or more of a state of operation of the brake, a state of operation of the accelerator, and on or off of the steering wheel touch sensor 32. Hence, it is possible to maintain the first driving assist mode or to make the transition from the first driving assist mode to the second driving assist mode through appropriately determining a driver's intention. Accordingly, it is possible to appropriately determine the driver's intension upon making the transition between the driving modes.

Although some implementations of the technology have been described in the foregoing with reference to the accompanying drawings, the technology is by no means limited to the implementations described above. Various changes and modifications may be made to any implementation without departing from the scope of the technology.

For example, the sensor unit that detects the shape of the road around the own vehicle M is not limited to a combination of the locator unit 11 and the camera unit 21. In one example implementation, a forward scanner, such as a laser scanning sensor, and any of the locator unit 11 and the camera unit 21 may be combined to configure a multiple system.

The driving mode setting calculator 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving mode setting calculator 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving mode setting calculator 22 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A driving assist apparatus comprising:
   a driving mode setting calculator configured to control a transition between driving modes of a vehicle in accordance with a driving condition, the driving modes including a manual driving mode, a first driving assist mode by which an automatic driving is performed on a basis of holding of a steering wheel by a driver, and a second driving assist mode by which the automatic driving is performed without the holding of the steering wheel by the driver;
   a brake operation detector configured to detect whether the driver operates a brake or releases the brake; and
   a steering wheel holding detector configured to detect whether the driver holds the steering wheel or releases the steering wheel,
   wherein the driving mode setting calculator causes the driving modes to make the transition from the first driving assist mode to the second driving assist mode, on a condition that the vehicle is in the first driving assist mode and the steering wheel holding detector detects that the driver releases, from a state in which the driver holds the steering wheel, the steering wheel, and
   wherein the driving mode setting calculator causes the driving modes to make the transition from the second driving assist mode to the first driving assist mode on a condition that the vehicle is in the second driving assist mode and the brake operation detector detects that the driver operates the brake.

2. The driving assist apparatus according to claim 1, further comprising:
   an accelerator operation detector configured to detect whether the driver operates an accelerator or releases the accelerator,
   wherein the driving mode setting calculator causes the driving modes to make the transition from the first driving assist mode to the second driving assist mode, further on a condition that the first driving assist mode is set as the driving modes, the accelerator operation detector detects that the driver releases the accelerator, and the brake operation detector detects that the driver releases the brake.

3. The driving assist apparatus according to claim 1, wherein the driving mode setting calculator suspends the transition from the first driving assist mode to the second driving assist mode upon causing the driving modes to make the transition from the first driving assist mode to the second driving assist mode, on a condition that the operation of the steering wheel detected by the steering wheel operation detector is determined by the driving mode setting calculator as being continued for a predetermined duration.

4. The driving assist apparatus according to claim 2, wherein the driving mode setting calculator suspends the transition from the first driving assist mode to the second driving assist mode upon causing the driving modes to make the transition from the first driving assist mode to the second driving assist mode, on a condition that the operation of the steering wheel detected by the steering wheel operation detector is determined by the driving mode setting calculator as being continued for a predetermined duration.

5. A driving assist apparatus comprising:
   a steering wheel holding detector configured to detect whether a driver holds a steering wheel or releases the steering wheel;
   a brake operation detector configured to detect whether the driver operates a brake or releases the brake; and
   circuitry configured to
      control a transition between driving modes of a vehicle in accordance with a driving condition, the driving modes including a manual driving mode, a first driving assist mode by which an automatic driving is performed on a basis of holding of the steering wheel by the driver, and a second driving assist mode by which the automatic driving is performed without the holding of the steering wheel by the driver, and
      cause the driving modes to make the transition from the first driving assist mode to the second driving assist mode, on a condition that the vehicle is in the first driving assist mode and the steering wheel holding detector detects that the driver releases, from a state in which the driver holds the steering wheel, the steering wheel,
      cause the driving modes to make the transition from the second driving assist mode to the first driving assist mode on a condition that the vehicle is in the second driving assist mode and the brake operation detector detects that the driver operates the brake.

6. The driving assist apparatus according to claim 1, wherein the driving mode setting calculator notifies an instructions to take driver's hands off the steering wheel before causing the driving mode to make the transition from the first driving assist mode to the second driving assist more, on a condition that the first driving assist mode is set as the driving mode and the detector detects that the driver releases, from a state in which the driver holds the steering wheel, the steering wheel.

* * * * *